Figure 1:
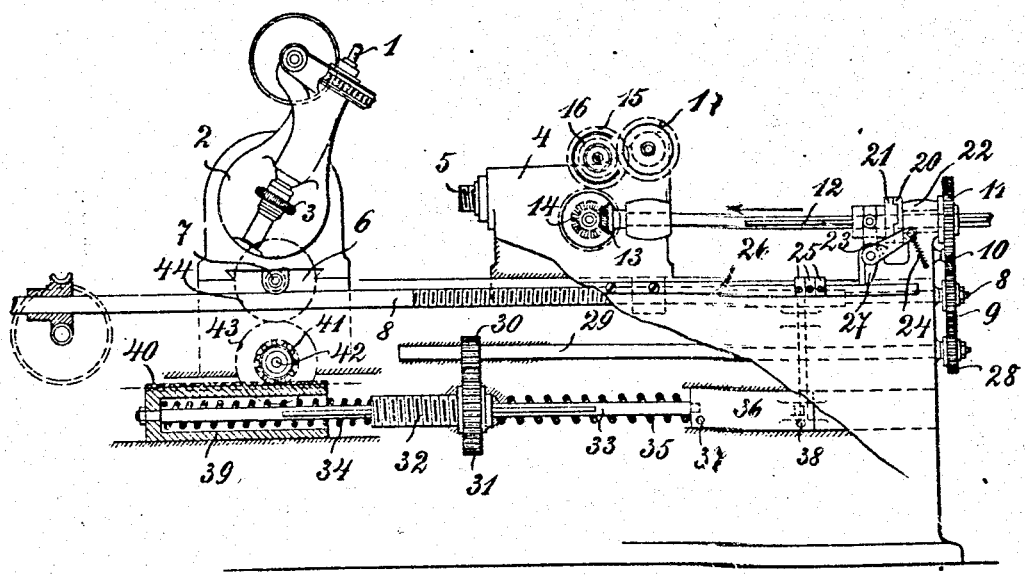

B. FRANZ.
MACHINE TOOL.
APPLICATION FILED FEB. 10, 1904.

917,577.

Patented Apr. 6, 1909.
2 SHEETS—SHEET 1.

WITNESSES:
W. M. Avery
H. E. Davis

INVENTOR
Bernhard Franz
BY
[signature]
ATTORNEYS.

B. FRANZ.
MACHINE TOOL.
APPLICATION FILED FEB. 10, 1904.
917,577.
Patented Apr. 6, 1909.
2 SHEETS—SHEET 2.
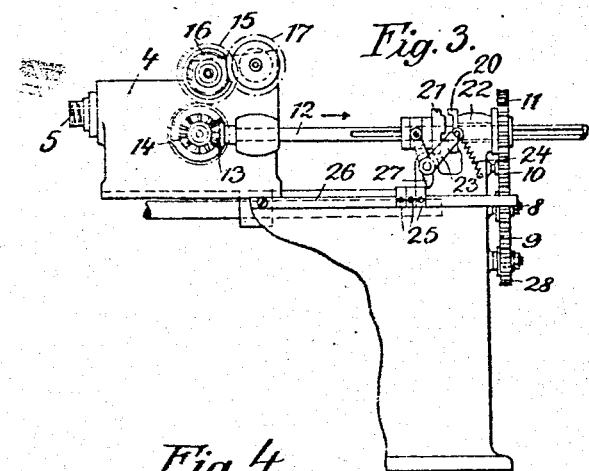
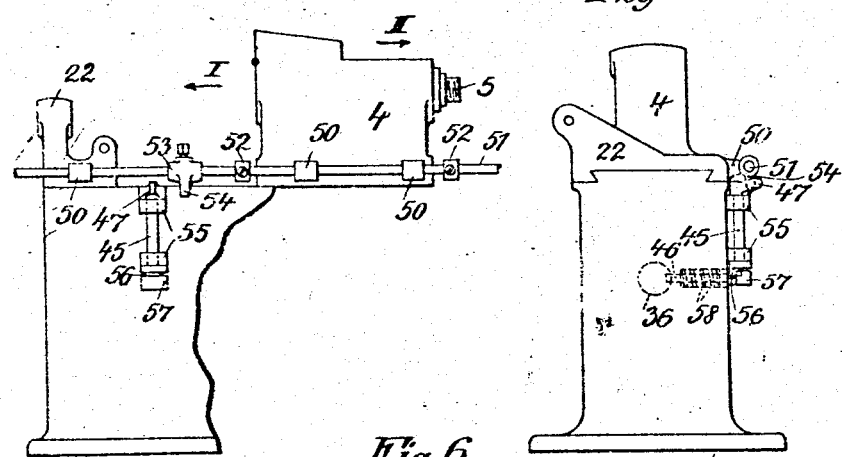
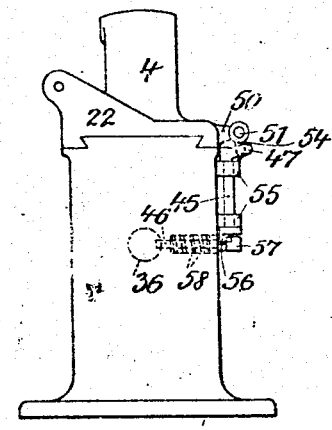
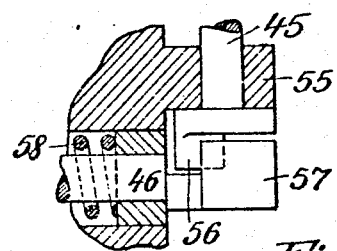
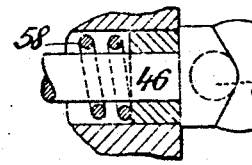
WITNESSES:
W. M. Avery
J. P. Davis
INVENTOR
Bernhard Franz
BY
Munn & Co
ATTORNEYS

UNITED STATES PATENT OFFICE.

BERNHARD FRANZ, OF LEIPZIG-PLAGWITZ, GERMANY, ASSIGNOR TO FRANZ & MASSMAN, OF LEIPZIG-LINDENAU, GERMANY, A FIRM.

MACHINE-TOOL.

No. 917,577.  Specification of Letters Patent.  Patented April 6, 1909.

Application filed February 10, 1904. Serial No. 192,919.

*To all whom it may concern:*

Be it known that I, BERNHARD FRANZ, a subject of the Emperor of Germany, residing at 20 Giesserstrasse, Leipzig-Plagwitz, in the Empire of Germany, manufacturer, have invented certain new and useful Improvements in Machine-Tools, of which the following is a specification.

This invention relates to machine tools in which the feed or re-setting of the work or of the tool for the next operation is effected automatically.

An object of the invention is to cause the feed or re-setting of the work or of the tool to take place on the one hand during the return movement, and on the other hand directly by means of the mechanism producing the return, so that a special dividing device is unnecessary. This is attained owing to the fact that the train of gearing producing the spiral retractive rotation is temporarily thrown out of gear so that the backward rotation is interrupted for the time being, whereby the retractive spiral rotation of the work or of the tool is shorter than the spiral feed by the amount corresponding to the division or setting. The path or angle through which the division or resetting takes place, is therefore so much the greater according as the train of gearing for the spiral movement is thrown out for a longer period during the return.

Another object of the invention is to so change the relative positive movement of tool and work on the return that either the work or the tool remains behind or is fed forward. In this manner the machine tool is simplified and time gained in its operation.

Here particularly is it possible by means of the novel method of dividing or re-setting to make the machine tool entirely automatic and to arrange it for continuous operation.

An important point is that any desired division may be effected with the greatest accuracy without the employment of special dividing plates, because the division or resetting is not dependent upon the division of a circle, but merely upon the measurement of a path the length of which may be calculated in correspondence with the desired division and exactly defined.

In this type of machine it is desirable that the tool should certainly be removed from the cut which it has made in the work before beginning of the setting. To this end, the tool is preferably moved out of reach of the work automatically and suddenly. This may be effected by means of a power storing device by the intermediary of which, upon the release of a locking bolt the tool is displaced. A device of this kind may be formed in duplicate so that in the first place it produces the forward movement of the tool and in the second place its backward movement. This speedy throwing in and out of gear of the tool presents the advantage that these operations will certainly be terminated before the machine begins its operations.

A milling machine is illustrated by way of example in the accompanying drawing, in which—

Figure 2:
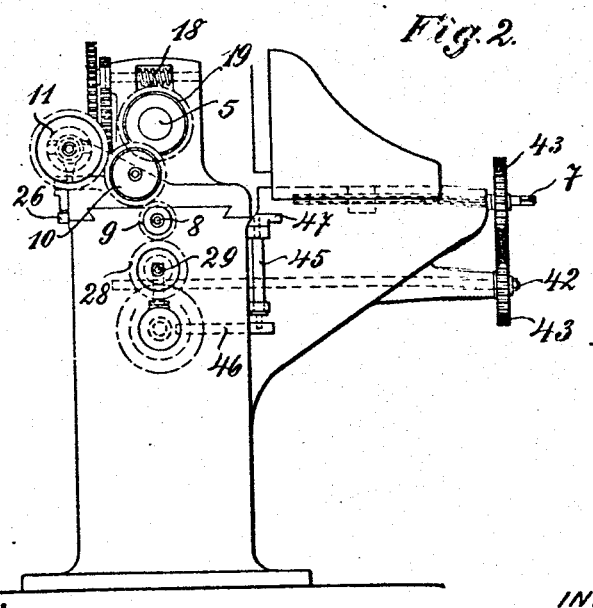

Figure 1 shows the same in side elevation. Fig. 2 is an end elevation. Fig. 3 is a fragmentary view similar to Fig. 1, showing the parts in a different position. Fig. 4 is a side view opposite that shown in Fig. 3 with parts omitted and showing the means for operating the locking bolt. Fig. 5 is an end view of Fig. 4; and Figs. 6 and 7 are detail sectional views.

In the example illustrated the spindle 1 mounted in the head stock 2 serves for the reception of the tool 3, while the slide or carriage 4 carries the spindle 5 for the work. The gear wheels mounted on the headstock or tool holder 2 and on the slide or carriage 4, may be of any appropriate kind and arrangement, in accordance with the purpose to be effected by the machine. If, for example, the milling machine is employed for cutting the spiral groove of a drill, the tool spindle 1 should be fixed with a suitable inclination upon the headstock 2. This latter is provided with a slideway 6 in order that by rotating the spindle 7 it may be caused to approach or recede from the work.

The forward feed and the return of the carriage 4 is effected by means of the spindle 8. By the rotation of the spindle 8 in one direction or the other, the carriage 4 with the work is reciprocated in the known manner. At the same time the work on the spindle 5 is positively rotated, as is necessary for the manufacture of spiral drills. The spindle 5 with the work is driven from the spindle 8 by the intermediary of the gear wheels 9,10, 11 and the shaft 12, which by means of additional gear wheels 13, 14, 15, 16 and 17 mounted on the carriage 4, operates the worm gear 18 and 19 directly driving the spindle 5, (see Fig. 2). In addition there is arranged on the shaft 12 a clutch 20—21 the construction of which is as follows. One half 20 of the clutch rotates together with the spur wheel 11 loosely upon the shaft 12 and with the same, is suitably mounted upon the bearing 22. The other half 21 of the clutch is slidably mounted by means of a groove and feather upon the shaft 12. The bent lever 23 pivoted to the clutch member 21 and acted upon by the spring 24, maintains the clutch normally closed.

The temporary disengagements of the clutch during the return of the carriage 4 are produced by means of tappets 25 or by means of a striking ledge of suitable length, mounted upon the rod 26 rigidly attached to the carriage 4. The tappets 25 coöperate with the projection 27 on the bent lever 23. The tappets 25 are so arranged on the rod 26 that they do not engage the projection 27 of the lever 23 on the beginning of the return movement of the carriage. During the forward movement of the carriage 4 in the direction indicated by the arrow in Fig. 1, that is to say during the feed of the work, the clutch 20, 21 is maintained closed as a result of the action of the spring 24, so that the shaft 12 remains coupled with the gear wheel 11 and the spindle 5 with the work is rotated. During the return movement of the carriage 4 in the direction indicated by the arrow in Fig. 3, on the other hand, the parts of the clutch are disengaged as soon as the tappets 25 encounter the stop 27 and held disengaged so long as the tappets are held in engagement with the stop. The duration of this disengagement is dependent upon the arrangement of the tappets and the length of the tappets 25 and of the stop 27, accordingly the length of the disengaged path determines the angular amount of the traverse or feed.

The automatic application and withdrawal of the tool is effected in the following manner: The gear wheel 28 mounted on the shaft 29 engages with the gear wheel 9 of the main spindle 8. Upon the shaft 29 is also mounted a gear wheel 30 which meshes with a gear wheel 31 which is not movable laterally. The hub of this gear wheel 31 is screw threaded and constitutes a screw nut for a screw coupling 32, which is mounted upon a rod 33 by means of a groove and feather in such a manner as to be slidable toward both sides, but not rotatable. The two pistons 36 and 39 are fixed to the ends of the rod 33. The position of the sleeve 32 and the transmission ratio are so selected that upon the termination of the forward and return movements of the carriage 4, one or other of the extremities of the sleeve 32 is situated in the hub of the wheel 31. Upon either side of the sleeve 32 spiral springs 34 and 35 are arranged upon the rod 33, the spring 35 bearing against the piston 36 and the spring 34 against the piston 39. The piston 36 is provided with two recesses 37 and 38 in one or other of which a locking bolt 46 is able to engage. The engagement and disengagement of this locking bolt is effected by means of the rod 45 rotatably mounted upon the frame of the machine and having at its lower end a crank pin engaging the said bolt. On the upper end of the rod is a tappet 47 by means of which the said rod is oscillated by the reciprocating slide or carriage 4. On the fixed bearing 22 and on the carriage 4 are bearings 50, in which a slidable rod 51 is held. On the rod 51 are rings or shoulders 52 with which the bearings 50 of the carriage contact so as to slide the rod 51 as the carriage moves back and forth.

Upon the rod 51 is adjustably mounted the sleeve 53 provided with the finger 54 extending into the path of the tappet 47 on the upper end of the rod 45. The lower end of the rod 45 is provided with the crank pin 56 engaging the head 57 of the bolt 46. The bolt 46 is normally held in an innermost position by a spring 58 so as to cause it to engage the recesses 37 and 38, whenever opposite the same and thereby lock the piston 36 in position.

On the forward movement of the carriage in Fig. 1, the finger 54 engaging the tappet 47 on the rod 45 causes a turning of the said rod and by the engagement of its crank pin 56 with the head 57 of the bolt 46, the said bolt will be withdrawn from the recess 37 or 38 with which it is at the time in engagement. As soon as the finger 54 passes the tappet 47, the spring forces the bolt inward to again engage the recess 37 or 38. At the same time owing to the construction of the head 57 of the bolt 46, the rod 45 will be returned to its normal position, so that its tappet will be again engaged by the finger 54 on the return movement of the carriage to again operate the bolt 46.

If the piston 36 and the rod 33 are locked by the engagement of the locking bolt 46 in one of the recesses 37, 38, they are unable to participate in the displacement of the sleeve 32. Therefore, according as the forward or return movement of the carriage 4 is taking place, one or other of the two spiral springs 34, 35 will be compressed by the displacement of the sleeve 32. The gradual compression of the spring is continued until, at the moment at which the tool is to be rendered operative or inoperative, the carriage 4 by the intermediary of the disengaging mechanism 45, 47, releases the locking bolt 46. As soon as the piston 36, and with it the rod 33, is released, the spring action which has been rendered available effects the return movement of the rod 33 in one direction or the other until reëngagement takes place.

The reciprocatory movement of the headstock 2, and the displacement rendering the tool 3 operative and inoperative are effected by means of the gear wheel 41, which the piston 39 rotates in one direction or the other with its rack 40, in accordance with the direction of the movement of the rod 33. Upon the shaft 42 of the gear wheel 41 is fixed a second gear wheel 43 which meshes with the wheel 44 mounted on the screw spindle 7 of the headstock 2, and transmits the movement of the shaft 42 and wheel 41 to the spindle 7. By this means the headstock 2 with the tool 3 are either caused to approach or recede from the work, according as the spring 34 or the spring 35 is operative.

This particular machine has been described as illustrative of a constructional form of the invention. The details of the apparatus here described may however vary without departing from the spirit of the invention.

I claim—

1. A machine tool, comprising a reciprocating work holder, means for rotating the work on the forward and return movement of the work holder, means for throwing said means for rotating the work out of operation on a part of the return movement of the work holder in such a manner that the helical retractive movement of the work is changed in comparison with the helical forward movement by the amount required for the feed of the work, a movable tool holder at one side of the work holder yielding means for moving the tool out of the path of the work before said means for rotating the work is thrown out of operation on the return movement of the work holder, means for tensioning said yielding means during the forward and the return movement of the work holder, and a releasable locking device for said yielding means.

2. A machine tool, comprising a reciprocating work holder, means for rotating the work on the forward and return movement of the work holder, means for throwing said means for rotating the work out of operation on a part of the return movement of the work holder to change the helical retractive movement of the work in comparison with the helical forward movement by the amount required for the feed of the work, a tool holder at one side of the work holder and reciprocating across the line of movement of the same, springs tensioned on the forward and the return movement of the work holder and serving to move the tool holder out of the path of the work on the return movement of the work holder before said means for rotating the work is thrown out of operation, and a releasable locking device holding the springs tensioned before its release.

3. A machine tool, comprising a reciprocating work holder, gearing for rotating the work on the forward and return movement of the work holder, means for throwing said gearing for rotating the work out of operation on a part of the return movement of the work holder to change the helical retractive movement of the work in comparison with the helical forward movement by the amount required for the feed of the work, a tool holder at one side of the work holder, means for reciprocating the tool holder across the line of movement of the work holder, a displaceable rod dependent on said gearing for rotating the work and acting upon the means for reciprocating the tool holder, a releasable locking device for said rod, springs arranged in connection with said rod and tensioned on the forward and the return movement of the work holder, and a part dependent on the work holder and serving for tensioning said springs.

4. A machine tool, comprising a reciprocating work holder, gearing for rotating the work on the forward and return movement of the work holder, means for throwing said gearing for rotating the work out of operation on a part of the return movement of the work holder to change the helical retractive movement of the work in comparison with the helical forward movement by the amount required for the feed of the work, a tool holder at one side of the work holder, means for reciprocating the tool holder across the line of movement of the work holder, a displaceable rod dependent on said gearing for rotating the work holder and acting upon the means for reciprocating the tool holder to move the tool out of the path of the work on the return movement of the work holder before the means for rotating the work is thrown out of operation, two spiral springs serving as power accumulators and in connection with said rod, a part moved by the gearing of the work holder and serving for tensioning alternately one of said two springs on the forward and the return movement of the work holder, and two locking recesses made in said rod for holding tensioned alternately one of said springs.

In testimony whereof I have hereunto set my hand in presence of two subscribing witnesses this 23d day of January 1904.

BERNHARD FRANZ.

Witnesses:
 WILHELM MARSSMANN,
 RUDOLPH FRICKE

It is hereby certified that the name of the assignee in Letters Patent No. 917,577, granted April 6, 1909, upon the application of Bernhard Franz, of Leipzig-Plagwitz, Germany, for an improvement in "Machine-Tools," was erroneously written and printed "Franz & Massman," whereas said name should have been written and printed *Franz & Massmann;* and that the said Letters Patent should be read with this correction therein that the same may conform to the record of the case in the Patent Office.

Signed and sealed this 18th day of May, A. D., 1909.

[SEAL.]

C. C. BILLINGS,
*Acting Commissioner of Patents.*